United States Patent [19]

Stüven et al.

[11] Patent Number: 4,779,675
[45] Date of Patent: Oct. 25, 1988

[54] PAIR OF SUBSTANCES FOR ABSORPTION HEAT TRANSFORMERS

[75] Inventors: Uwe Stüven; Adolf Schmidt, both of Hofheim am Taunus, Fed. Rep. of Germany

[73] Assignee: Hoechst Aktiengesellschaft, Frankfurt am Main, Fed. Rep. of Germany

[21] Appl. No.: 938,019

[22] Filed: Dec. 4, 1986

[30] Foreign Application Priority Data

Dec. 6, 1985 [DE] Fed. Rep. of Germany ....... 3543171

[51] Int. Cl.⁴ ............................................. F28D 25/00
[52] U.S. Cl. ................................... 165/104.12; 62/112
[58] Field of Search .................... 62/112, 114; 165/104.12

[56] References Cited

U.S. PATENT DOCUMENTS

| | | | |
|---|---|---|---|
| 2,308,665 | 1/1943 | Zellhoefer et al. | 62/112 |
| 4,428,854 | 1/1984 | Enjo et al. | 62/112 X |
| 4,448,040 | 5/1984 | Kunugi | 62/112 X |
| 4,455,247 | 6/1984 | Nakayama et al. | 252/52 A X |

Primary Examiner—Michael Koczo
Assistant Examiner—Peggy Neils

[57] ABSTRACT

The pair of substances for absorption heat transformers consists of methanol and tetraethylene glycol dimethyl ether.

1 Claim, 1 Drawing Sheet

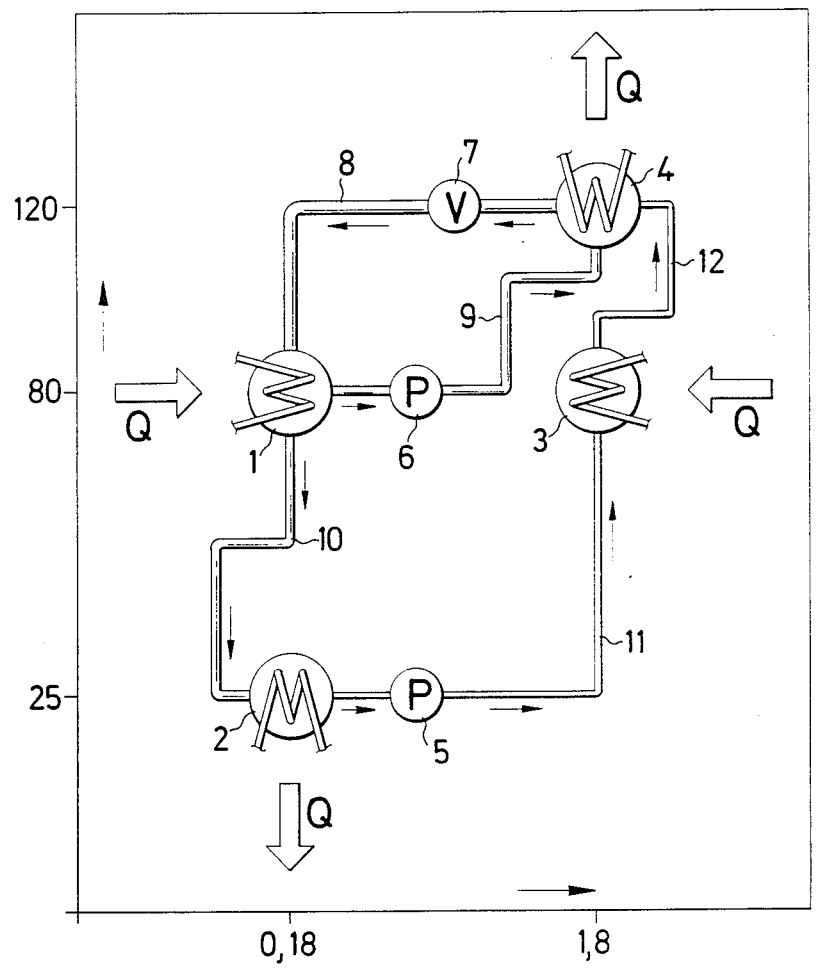

PAIR OF SUBSTANCES FOR ABSORPTION HEAT TRANSFORMERS

The present invention relates to a pair of substances, which can be employed in an absorption heat transformer for increasing the temperature of heat flows at a medium temperature level.

The fundamental concept of transforming heat from a medium temperature level, without the supply of significant quantities of exergy, to a higher temperature level, which is thus useful once again, has already been known for a long period of time. The heat transformer can preferably be used in circumstances in which a heat flow of a medium temperature level is available with a sufficiently large exergy contribution and a compression heat pump or an absorption heat pump reaches its technical or economic limits. As a rule, this is so in circumstances in which a large temperature increase is required in the range of higher temperatures or in which the nature and composition of the heat removal medium does not permit, for example, the use of vapor compressors. As compared with the sorption heat pump or the compression heat pump, the sorption heat transformer requires considerably less primary energy, since the exergy necessary for the temperature increase is directly extracted from the heat flow to be transformed. Typical values are approximately 2 to 5% additional energy, related to the useful heat flow. Since hardly any mechanically driven parts are present, the absorption heat transformer is also distinguished by a low maintenance requirement, a low noise level, easy setting-up under open-air conditions and low wear.

Some pairs of substances for absorption heat transformers are already known. They originate, in general, from the sector of sorption heat pumps, and consist of a solvent and a volatile substance to be dissolved (water/ammonia, lithium bromide/water). At the temperatures entering into consideration, ammonia exhibits boiling pressures between 50 and 100 bar, so that, for reasons associated with safety engineering, economics and also toxicology, the use of this substance is restricted and problematic. The pair of substances lithium bromide/water requires high vacuum, which leads to apparatuses of large dimensions with exacting sealing requirements. Moreover, crystallization and corrosion problems can arise.

In addition, the pairs of substances sulfuric acid/water and tetraethylene glycol dimethyl ether/trifluoroethanol are also suitable for use in sorption heat transformers. In the case of the pair of substances sulfuric acid/water, high vacuum is again required, which leads to apparatuses of appropriately large dimensions. Moreover, corrosion problems can arise.

The liquid working medium trifluoroethanol with the solvent tetraethylene glycol dimethyl ether was formerly regarded as the most favorable pair of substances for the operation of a heat transformer.

Accordingly, the object of the invention is to provide a pair of working substances, which can transport more heat in a technically better pressure range (vacuum on desorption and condensation: a maximum of 150 mbar; pressure on evaporation and absorption: a maximum of 10 bar) per kg of solution than the pair of substances trifluoroethanol/tetraethylene glycol dimethyl ether (TEGDME) which is currently judged, on the whole, to be the most favorable. Further requirements, for example low corrosiveness, low toxicity, thermal stability and the availability of adequate quantities for technical installations, should likewise be fulfilled.

It has now been found that the pair of substances methanol/TEGDME fulfills these requirements.

Measurements of the vapor/liquid equilibrium of the two pairs of substances have shown that, depending upon the particular operating conditions, in the case of the pair of substances methanol/TEGDME up to 25% more heat can be transported per kg of solution than in the case of the pair of substances trifluoroethanol/TEGDME.

Only below a heat removal temperature of 65° C. must the evaporator and absorber be operated under vacuum, while in the case of the pair of substances trifluoroethanol/TEGDME this is required already at heat removal temperatures below 75° C.

The toxicity of methanol and TEGDME has been extensively investigated and can be controlled well from the point of view of safety engineering. Both substances are available in adequate quantities. The pair of substances methanol/TEGDME exhibits a high degree of thermal stability.

The invention will be explained in greater detail below, with reference to the figure:

The figure shows—in a very greatly simplified presentation—an absorption heat transformer process. The heat flow into the system and out of the system is designated by Q and indicated by the arrow direction. In the evaporator (3), the working medium is evaporated by heat absorption at 60° C. to 140° C., preferably at 65° C.-100° C., and a pressure between 1 and 10 bar, preferably between 1 and 6 bar. The working medium vapor passes via line (12) into the absorber (4) and is there dissolved in the solvent at temperatures between 90° C. and 180° C., preferably between 100° C. and 150° C., and a pressure between 1 and 10 bar, preferably between 1 and 6 bar. In this procedure, heat is liberated, which can be used, for example, for the generation of water vapor. The solvent enriched with working medium (rich solution) passes via line (8) and the expansion valve (7) into the expeller (1). The expulsion of methanol from the solution takes place between 60° C. and 140° C., preferably between 60° C. and 100° C., and at a pressure of approximately 180 mbar.

The desorbed working medium passes via line (10) into the condenser (2). In the condenser (2), the working medium vapor is condensed at temperatures between 0° C. and 30° C., preferably at ambient temperature (e.g. 25° C.) and a pressure of approximately 180 mbar. The heat of condensation which is liberated in this procedure is lost and forms the drive of the sorption heat transformer.

From the condenser (2), the liquid working medium is pumped by pump (5) via line (11) into the evaporator (3).

The solution which has been impoverished in working medium in the expeller (1) by desorption of working medium (poor solution) is pumped by pump (6) via line (9) back into the absorber (4), and can there once again dissolve working medium vapor from the evaporator (3).

The heat transformer cyclic process takes place between two pressure levels. The pressure of the low-pressure side (after the expansion valve, expeller to poor-solution pump, condenser to working medium pump) results from the saturation vapor pressure of the working medium at the condensation temperature. The pressure of the high-pressure side (from the poor-solution pump outlet, working medium pump outlet, evaporator, absorber to expansion valve) results from the saturation vapor pressure of the working medium at the evaporation temperature.

The quality of a pair of substances which is suitable for the sorption heat transformer may be assessed with reference to several properties. The greater the product of heat of evaporation of the working medium and degassing width, i.e. the difference between the solubilities of the working medium in the absorber and in the expeller, the greater is the quantity of heat which can be transported per kg of solution. It can be advantageous that the vapor pressure curves of working medium and solvent exhibit a progression such that the system pressure is in the vicinity of the ambient pressure, and moreover a simple expulsion is possible without costly rectification.

The position of the centers of the schematically represented system parts 1 (expeller), 2 (condenser), 3 (evaporator) and 4 (absorber) with respect to the co-ordinate system shown on the figure illustrates at the same time preferred working conditions with regard to the pressure and temperature levels for the heat transformer with the pair of substances according to the invention. For varying working conditions, the following quantities of heat can be transported per kg of solution:

| Absorber temperature | TFE/TEGDME | MeOH/TEGDME |
|---|---|---|
| 1. Evaporator/expeller temperature 70° C. | | |
| 100° C. | 62.1 kJ/kg | 68.3 kJ/kg |
| 110° C. | 26.7 kJ/kg | 29.3 kJ/kg |
| 2. Evaporator/expeller temperature 80° C. | | |
| 110° C. | 86.3 kJ/kg | 107.6 kJ/kg |
| 120° C. | 51.2 kJ/kg | 52.2 kJ/kg |
| 130° C. | 24.3 kJ/kg | 29.4 kJ/kg |
| 3. Evaporator/expeller temperature 100° C. | | |
| 130° C. | 110.9 kJ/kg | 131.3 kJ/kg |
| 150° C. | 52.8 kJ/kg | 46.8 kJ/kg |
| 170° C. | 24.8 kJ/kg | 18.5 kJ/kg |

TFE = trifluoroethanol
MeOH = methanol
TEGDME = tetraethylene glycol dimethyl ether The lower the temperature in the absorber, the greater is the loading of the TEGDME with methanol. The higher the temperature in the expeller, the lower is the residual loading. The TEGDME/methanol mixture ratio is thus dependent upon the operating conditions. In the majority of cases, the proportion of methanol by weight amounts to 1–30%, preferably 3–15% of the total mixture. The degassing width is between 3.5 and 15%, in the temperature range and pressure range which have been indicated.

What is claimed:

1. A process for raising the temperature of a waste heat source to a higher level by means of a heat transformer with a combination of working substances consisting essentially of working medium and solvent, wherein the working medium/solvent combination consists essentially of 1 to 30% by weight of methanol, as working medium, and 99 to 70% by weight of tetraethylene glycol dimethyl ether, as solvent, and wherein the working medium is evaporated in an evaporation zone by means of waste heat at from 60° to 140° C. at pressures of 1 to 10 bar, and the resulting vapor is absorbed in the solvent of the said combination, in an absorption zone, the heat of absorption is removed, the solvent thus enriched with working medium is expanded, the working medium is expelled at temperatures of 60° to 140° C. and pressures of 150 to 200 mbar and condensed at temperatures of 0° to 30° C., the heat of condensation is removed, and the thus-condensed, liquid working medium is recycled with a pressure increase of 1 to 10 bar to the evaporation zone, the solvent being recycled with a pressure increase of 1 to 10 bar to the absorption zone.

* * * * *